US00RE48595E

(19) United States
(12) Reissued Patent
Lee et al.

(10) Patent Number: US RE48,595 E
(45) Date of Reissued Patent: Jun. 15, 2021

(54) METHOD AND SYSTEM FOR DETERMINING OPTIMAL EXPOSURE OF STRUCTURED LIGHT BASED 3D CAMERA

(71) Applicant: SUNGKYUNKWAN UNIVERSITY FOUNDATION FOR CORPORATE COLLABORATION, Gyeonggi-do (KR)

(72) Inventors: Sukhan Lee, Gyeonggi-do (KR); Moon Wook Ryu, Seoul (KR); Dae Sik Kim, Gyeonggi-do (KR)

(73) Assignee: SUNGKYUNKWAN UNIVERSITY FOUNDATION FOR CORPORATE COLLABORATION, Gyeonggi-do (KR)

(21) Appl. No.: 16/121,341

(22) Filed: Sep. 4, 2018

Related U.S. Patent Documents

Reissue of:
(64) Patent No.: 7,957,639
Issued: Jun. 7, 2011
Appl. No.: 12/032,375
Filed: Feb. 15, 2008

(30) Foreign Application Priority Data

Jan. 23, 2008 (KR) ..... 10-2008-0007228

(51) Int. Cl.
*G03B 7/00* (2021.01)

(52) U.S. Cl.
CPC ..... *G03B 7/003* (2013.01)

(58) Field of Classification Search
CPC ..... G03B 7/003; G03B 7/00; H04N 5/232
USPC ..... 396/213, 324; 348/362, 363, 364, 221.1
See application file for complete search history.

(56) References Cited

U.S. PATENT DOCUMENTS

| | | | | |
|---|---|---|---|---|
| 5,085,502 | A * | 2/1992 | Womack et al. | 356/605 |
| 5,661,667 | A * | 8/1997 | Rueb et al. | 702/95 |
| 6,122,062 | A * | 9/2000 | Bieman et al. | 356/621 |
| 6,252,623 | B1 * | 6/2001 | Lu et al. | G01B 11/25 348/42 |
| 6,278,460 | B1 * | 8/2001 | Myers et al. | 345/424 |
| 6,503,195 | B1 | 1/2003 | Keller et al. | |
| 6,512,892 | B1 * | 1/2003 | Montgomery et al. | 396/326 |

(Continued)

FOREIGN PATENT DOCUMENTS

KR 10-2005-0041525 5/2005

OTHER PUBLICATIONS

Caspi et al., "1 0-1 Adaptive Color Structured Light," IAPR Workshop on Machine Vision Applications, Makuhari, Chiba, Japan (Nov. 17-19, 1998).

(Continued)

*Primary Examiner* — Kenneth Whittington
(74) *Attorney, Agent, or Firm* — Volpe Koenig

(57) ABSTRACT

Provided are a method and system for determining an optimal exposure of a structured light based 3D camera. The system includes a projecting means for illuminating a predetermined pattern on a target object, an image capturing means for capturing an image of the target object with the pattern projected, and a processing means for reconstructing 3D data for the target object by identifying the pattern of the captured images from the image capturing means. The system automatically determines an optimal exposure of the structured light based 3D camera system through analyzing the captured image of the target object.

26 Claims, 10 Drawing Sheets

(56) References Cited

U.S. PATENT DOCUMENTS

| | | | | |
|---|---|---|---|---|
| 6,556,706 | B1 * | 4/2003 | Geng | 382/154 |
| 7,054,067 | B2 * | 5/2006 | Okano et al. | 359/622 |
| 7,453,456 | B2 * | 11/2008 | Petrov et al. | 345/419 |
| 7,560,679 | B1 * | 7/2009 | Gutierrez | 250/208.1 |
| 8,817,171 | B2 | 8/2014 | Yuyama | |
| 2003/0107644 | A1 * | 6/2003 | Choi | 348/49 |
| 2003/0123713 | A1 * | 7/2003 | Geng | 382/118 |
| 2005/0237423 | A1 * | 10/2005 | Nilson et al. | 348/370 |
| 2006/0029382 | A1 * | 2/2006 | Uchida | G03B 7/00 396/166 |
| 2007/0052839 | A1 * | 3/2007 | Kong | G03B 7/08 348/364 |
| 2007/0086762 | A1 * | 4/2007 | O'Keefe et al. | 396/16 |
| 2007/0195162 | A1 * | 8/2007 | Graff et al. | 348/47 |
| 2008/0012850 | A1 * | 1/2008 | Keating, III | 345/419 |
| 2008/0106634 | A1 * | 5/2008 | Masuda | H04N 5/2258 348/362 |
| 2009/0040364 | A1 * | 2/2009 | Rubner | G06T 3/4053 348/362 |

OTHER PUBLICATIONS

Koninckx et al., "Scene-adapted structured light," 2005 IEEE Computer Society Conference on Computer Vision and Pattern Recognition, vol. 2 (2005).

*Sungkyunkwan University, Research and Business Foundation* v. *LMI Technologies* (*USA*) *Inc.,* Notice of Motion and Motion to Dismiss of Defendant LMI Technologies (USA) Inc., Case No. 3:16-cv-6966-VC, pp. 1-16 (Mar. 21, 2017).

*Sungkyunkwan University, Research and Business Foundation* v. *LMI Technologies* (*USA*) *Inc.,* Original Complaint, Case No. 3:16-cv-6966-VC, pp. 1-6 (Dec. 4, 2016).

*Sungkyunkwan University, Research and Business Foundation* v. *LMI Technologies* (*USA*) *Inc.,* Reply Brief in Support of Motion to Dismiss of Defendant LMI Technologies (USA) Inc., Case No. 3:16-cv-6966-VC, pp. 1-11 (Apr. 18, 2017).

*Sungkyunkwan University, Research and Business Foundation* v. *LMI Technologies* (*USA*) *Inc.,* Order Granting Motion to Dismiss, Case No. 3:16-cv-6966-VC, pp. 1-3 (May 3, 2017).

* cited by examiner

| | Iris (#F) | Shutter speed | STOP | |
|---|---|---|---|---|
| To open iris | 1.0 | 1/4 | +5 | Low shutter speed |
| | 1.4 | 1/8 | +4 | |
| | 2.0 | 1/15 | +3 | |
| | 2.8 | 1/30 | +2 | |
| | 4.0 | 1/60 | +1 | |
| standard | 5.6 | 1/125 | 0 | standard |
| | 8.0 | 1/250 | -1 | |
| | 11 | 1/500 | -2 | |
| | 16 | 1/1000 | -3 | High shutter speed |
| To close iris | 22 | 1/2000 | -4 | |
| | 32 | 1/4000 | -5 | |

(I) iris F-2, shutter speed 1/60

(II) iris F-4, shutter speed 1/15

(I)

(II)

METHOD AND SYSTEM FOR DETERMINING OPTIMAL EXPOSURE OF STRUCTURED LIGHT BASED 3D CAMERA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present application claims priority under 35 U.S.C. 119 to Korean Patent Application No. 10-2008-0007228 (filed on Jan. 23, 2008), which is hereby incorporated by reference in its entirety.

TECHNICAL FIELD

Embodiments relates to a method and system for determining an optimal exposure of a structured light based 3D camera and, more particularly, to a method and system for determining an optimal exposure level of a structured light based 3D camera for improving reconstructable range and reliability of 3D data by controlling camera exposure according to diverse environmental variations based on an automatically determined optimal exposure level.

BACKGROUND 3D cameras using structured light are a modified version of a stereo camera which uses two or more identical cameras to obtain 3D information. Unlike the stereo camera, the 3D camera includes a camera and a projecting unit such as a beam projector instead of having two identical cameras. Such a structured light based camera system illuminates a predetermined pattern on an object using the projecting unit, captures an image of the object with the pattern illuminated thereon using an image capturing unit such as a camera, and obtains 3D information by analyzing the obtained pattern.

Although a stereo camera system passively uses features of an image, the structured light based camera system actively uses the pattern illuminated from the projecting unit as features. Therefore, the structured light based camera system has advantages of a fast processing speed and a high spatial resolution. Due to the advantages, the structured light based camera system has been widely used for object modeling/recognition, three dimensional (3D) ranging, industrial inspection, and reverse engineering. Particularly, in an intelligent robot engineering field, a home service robot needs a structured light based camera system for the large scale of 3D data for workspace modeling because an ordinary stereo camera system cannot obtain 3D information from a plain and simple environment which does not have sufficient characteristic information or no background color variation, that is, an environment with no feature point.

In the structured light camera system, the precision of 3D data depends on discrimination of patterns, which are illuminated from a projector, from an image. However, it is difficult to discriminate patterns in a real environment that dynamically varies in time or under various object conditions.

For example, it is difficult to identify patterns illuminated on an object having low reflectivity such as a black cloth because a camera cannot accurately capture the patterns illuminated on the black cloth. On the contrary, it is also difficult to identify patterns illuminated on an object having high reflectivity such as an opalescent white object because the patterns show spread phenomenon (saturation) in a captured image due to the opalescent characteristic.

In general, the structured light based camera controls a camera iris to receive more light for an object having low reflectivity. On the contrary, the structured light based camera controls a camera iris to receive limited light in order to prevent spread phenomenon (saturation) for an object having high reflectivity.

Difficulty of pattern discrimination in real environment divides into two kinds. First, it is difficult to control an exposure level according to an object because a real environment includes various objects each having different reflectivity due to colors and textures of objects. Secondly, different exposure levels are required according to the illumination of a peripheral environment. For example, an exposure level of a structured light based camera must be differently controlled when the structured light based camera operates in a bright environment from when the structured light based camera operates in a dark environment.

Although it is required that an exposure level must be adjusted properly in dynamically-varying environmental factors in order to accurately identify patterns, most of researches for structured light based camera systems have been progressed under assumptions of fixed environmental factors with constant surrounding light. Therefore, there is a demand for developing a technology for dynamically controlling an exposure level of a camera according to change of various environmental factors, for example, whenever time, position, and distance changes with respect to a service robot's mission.

SUMMARY

Embodiments have been proposed in order to provide a method and system for determining an optimal exposure of a structured light based 3D camera for improving reconstructable range and reliability of 3D data by controlling camera exposure according to diverse environmental variations based on an automatically determined optimal exposure level.

Embodiments have been proposed in order to provide a method for generating a characteristic curve to estimate brightness variation of a pixel according to an exposure level in order to determine an optimal exposure according to various environmental factors.

In embodiments, a method for determining an optimal exposure level of a structured light based three dimensional (3D) camera system, which includes a projecting means for illuminating a predetermined pattern on a target object, an image capturing means for capturing an image of the target object with the pattern projected, and a processing means for reconstructing 3D data based on captured image, automatically determines an optimal exposure level of the structured light based 3D camera system through analyzing the captured image of the target object. The method includes the steps of: a) obtaining an image of a target object with a predetermined pattern projected thereon, which is illuminated from a projecting means, and an image of the target object without a predetermined pattern projected thereon; b) dividing an intensity of a corresponding pixel into red intensity, green intensity, and blue intensity of three channels (R, G, B) for one same pixel at each of the captured images, and generating a characteristic curve for each of the three channels for showing the intensity of a pixel for each channel according to variation of exposure levels; c) estimating intensity I of the corresponding pixel according to variation of exposure levels using the generated characteristic curves, and calculating an intensity difference ΔI or a brightness ratio SNR between the image of the target object with the predetermined pattern projected and the image of the target object without the predetermined pattern for the corresponding pixel using the estimated intensity; d) collecting brightness data about intensity differences ΔI or brightness ratios SNR according to variation of exposure levels for all pixels by repeating the steps b) and c) for all pixels of each image; e) discriminating pixels with spread phenomenon (saturation) occurred or the pixels without the predetermined pattern projected when the projecting means projects the predetermined pattern from the collected brightness data and excluding the brightness data of the discriminated pixels; and f) calculating the number of pixels having an intensity difference ΔI and a brightness ratio SNR exceeding a predetermined threshold $\Delta I_{th}$ or $SNR_{th}$ at every exposure levels using the brightness data filtered at the step e) and deciding an exposure level having a largest calculated number of pixels as an optimal exposure level.

In another embodiments, a system for determining an optimal exposure of a structured light based three dimensional (3D) camera system includes: a projecting means for illuminating a predetermined pattern on a target object; an image capturing means for capturing an image of the target object with the pattern projected; and a processing means for calculating 3D data for the target object by identifying the pattern of the captured images from the image capturing means. The processing means sequentially performs operation including the steps of: a) obtaining an image of a target object with a predetermined pattern projected thereon, which is illuminated from a projecting means, and an image of the target object without a predetermined pattern projected thereon; b) dividing an intensity of a corresponding pixel into red intensity, green intensity, and blue intensity of three channels (R, G, B) for one same pixel at each of the captured images, and generating a characteristic curve for each of the three channels for showing the intensity of a pixel for each channel according to variation of exposure levels; c) estimating intensity I of the corresponding pixel according to variation of exposure levels using the generated characteristic curves, and calculating an intensity difference ΔI or a brightness ratio SNR between the image of the target object with the predetermined pattern projected and the image of the target object without the predetermined pattern for the corresponding pixel using the estimated intensity; d) collecting brightness data about intensity differences ΔI or brightness ratios SNR according to variation of exposure levels for all pixels by repeating the steps b) and c) for all pixels of each image; e) discriminating pixels with spread phenomenon (saturation) occurred or the pixels without the predetermined pattern projected when the projecting means projects the predetermined pattern from the collected brightness data and excluding the brightness date of the discriminated pixels; and f) calculating the number of pixels having an intensity difference ΔI and a brightness ratio SNR exceeding a predetermined threshold $\Delta I_{th}$ or $SNR_{th}$ at every exposure levels using the brightness data filtered at the step e) and deciding an exposure level having a largest calculated number of pixels as an optimal exposure level.

In another embodiments, a method for generating a characteristic curve of a structured light based three dimensional (3D) camera system, which includes a projecting means for illuminating a predetermined pattern on a target object, an image capturing means for capturing an image of the target object with the pattern projected, and a processing means for reconstructing 3D data using the captured image, includes the steps of: a) capturing an image of a target object with a predetermined pattern projected thereon from the projecting means and another image of the target object without the predetermined pattern projected thereon; b) calculating proportional factors $k_R$, $k_G$, and $k_B$ by applying an exposure applied for capturing the images in the step a) and red intensity, green intensity, and blue intensity of a red channel, a green channel, and a blue channel measured for one same pixel in each of the captured images to an equation: $I_R=k_R*E$, $I_G=k_G*E$, $I_B=k_B*E$, where $I_R$, $I_G$, and $I_B$ denote the intensities in R, G, and B channels, $k_R$, $k_G$, and $k_B$ denote a proportional factor, and E denotes an exposure; c) calculating intensity of a corresponding pixel for an input exposure by applying various exposure to the equation; and d) generating a graph by corresponding intensity to a varying exposure using the data obtained in the step c).

DRAWINGS

The patent or application file contains at least one drawings executed in color. Copies of this patent or patent application publication with color drawings will be provided by the Office upon request and payment of the necessary fee.

DESCRIPTION

Hereinafter, embodiments of the present invention will be described in detail with reference to the accompanying drawings.

At first, a concept of camera exposure will be briefly described before describing embodiments.

Exposure

Exposure means an amount of light used when a camera captures an image, and an exposure level is controlled by an iris and a shutter speed.

An iris is metal plates disposed at a camera lens. An amount of incoming light is controlled by opening and closing the iris. The size of an iris is expressed as a F-number. The smaller the F-number is, the wider an aperture becomes, thereby receiving more light in a short time. The shutter speed is an opening time of a lens. The shutter speed is controlled by turning on/off a charge coupled device (CCD) sensor at a designated time. An exposure level related to an amount of light is expressed as STOP. One STOP difference increases or decreases an amount of light two times.

Figures 1A, 1B:
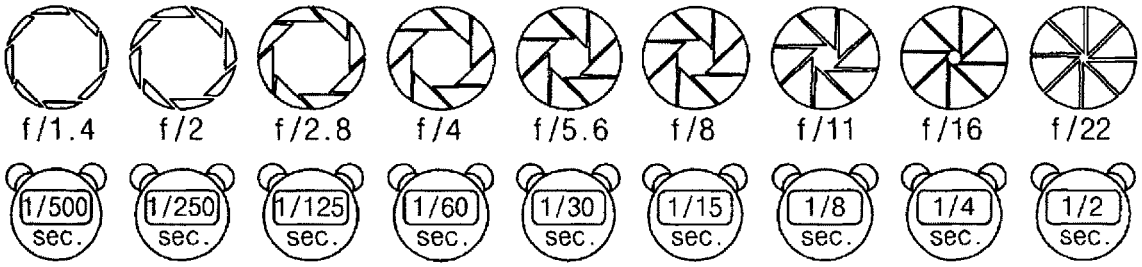
FIG.1a PRIOR ART
FIG. 1b PRIOR ART
FIGS. 1a and 1b are a table and a diagram showing relation among an iris, a shutter speed, and exposure level.

FIGS. 1a and 1b are a table and a diagram showing relation among an iris, a shutter speed, and exposure level.

As shown in FIGS. 1a and 1b, an iris F-4 may receive two times more light than an iris F-5.6. A shutter speed 1/60 may receive two times more light than a shutter speed 1/125 by opening the iris for comparatively long time. A combination of an iris F-4 and a shutter speed 1/15 has an exposure level of +4 STOP which is the same exposure level of a combination of an iris F-2 and a shutter speed 1/60. Here, +4 STOP means STOP 4-levels higher than 0 STOP which is a reference STOP (F5.6 1/125). As described above, a predetermined exposure level may be made by various methods through properly controlling combinations of an iris and a shutter speed.

Figure 2:
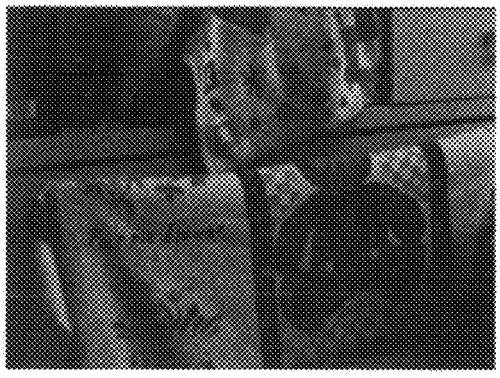
FIG. 2 shows images captured with the same exposure level under different condition sets of an iris and a shutter speed.
Figure 2:
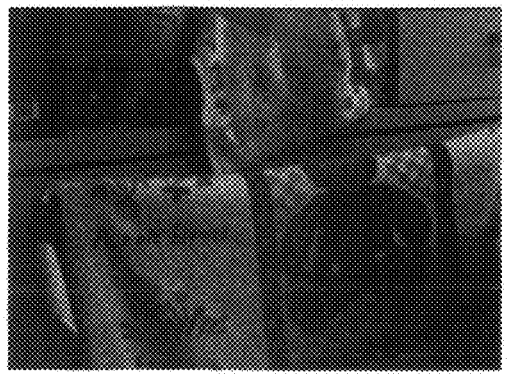

FIG. 2 shows images captured with the same exposure level under different combination of an iris and a shutter speed.

In FIG. 2, an image I is captured under a setting of +4 STOP, F-2, and 1/60. An image II is captured under a setting of +4 STOP, F-4, and 1/15. As shown, images captured under the same exposure level have the same brightness although the combinations of an iris and a shutter speed are different. Finally, the camera exposure may be expressed as Eq. 1.

$$E=i\times t \qquad \text{Eq. 1}$$

In Eq. 1, E denotes exposure, i denotes intensity of light, and t denotes an exposure time.

A structured light based 3D camera system includes a projecting means for illuminating a predetermined pattern on a target object, an image capturing means for capturing an image with the pattern illuminated thereon, and a processor for identifying the pattern from the captured image and calculating 3D data for the target object. For example, the projecting unit may be a typical projector using a code pattern, the image capturing means may be a camera, and the processor may be a computer.

Meanwhile, the precision of the calculated 3D data depends on how accurately the pattern is discriminated from the captured image. In order to obtain optimal exposure for pattern discrimination in the present embodiment, an image captured from a projected pattern without spread phenomenon (saturation) is compared with an image captured from a non-projected reference scene, and a pattern may be optimally discriminated when the intensity difference therebetween becomes the maximum. As a scale for the intensity difference, SNR and ΔI are used in the present embodiment. SNR is a ratio of brightness of an image obtained from a non-projected reference scene and brightness of an image obtained from a projected pattern. ΔI denotes difference between brightness of an image captured from a non-projected reference scene and brightness of an image captured from a projected pattern. In order to determine an optimal exposure level of a camera according to dynamically changing environmental factors, the structured light based camera system employs a method for automatically determining an optimal exposure level by analyzing an image captured at a predetermined exposure level.

Figure 3:
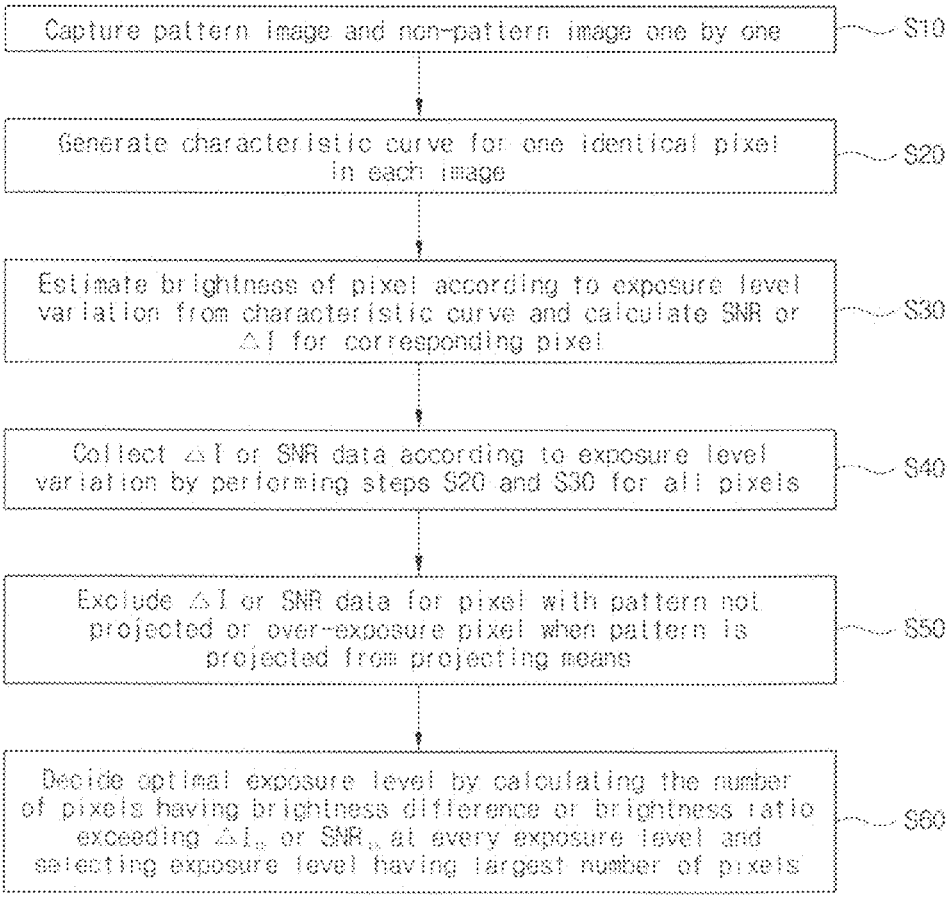
FIG. 3 is a flowchart illustrating a method for determining an optimal exposure of a structured light based 3D camera system in accordance with an embodiment.

FIG. 3 is a flowchart illustrating a method for determining an optimal exposure of a structured light based 3D camera system in accordance with an embodiment.

In order to determine an optimal exposure level, the processor according to the present embodiment performs operations as follows. At step S10, the processor obtains a pattern illuminated image and a non pattern illuminated image for a target object one by one. At step S20, the processor generates a characteristic curve for the same predetermined pixel in each of the captured images. At step S30, the processor estimates an intensity of a pixel according to an exposure level using the generated characteristic curve and calculates an intensity difference ΔI or a brightness ratio SNR for a corresponding pixel. Hereinafter, the intensity denotes brightness of a pixel. At step S40, the processor collects ΔI and SNR data according to exposure level variation for all pixels of each image by repeating the steps S20 and S30. At step S50, the processor excludes ΔI or SNR data for an over exposed pixel or a non-pattern illuminated pixel when the projecting means projects the predetermined pattern. At step S60, the processor calculates the number of pixels having the intensity difference and the brightness ratio exceeding a predetermined threshold $\Delta I_{th}$ or $SNR_{th}$ at every exposure levels and determines an exposure level providing the largest number of pixels as an optimal exposure level.

In the step S10, the processor obtains a non-pattern illuminated image and a pattern illuminated image one by one. The non-pattern illuminated image is a color image obtained with the projecting means turned off, which will be referred as a 0 state, hereinafter. The pattern illuminated image is a color image obtained with the projecting means turned on, which will be referred as a 1 state, hereinafter. Here, the image of the 0 state and the image of the 1 state are captured at an initial exposure level.

In the step S20, the processor selects one pixel at the same position from two obtained images and generates characteristic curves showing intensity variation according to exposure levels.

The characteristic curve is a graph showing intensity of a pixel varying according to exposure using a principle that Eq. 1 and intensity changes in proportion to an amount of incoming light. The characteristic curve is used to determine an optimal exposure level in the present embodiment. The characteristic curve can be expressed as Eq. 2 if color intensity of a corresponding pixel divides into three channels, red intensity (R), green intensity (G), and blue intensity (B).

$$I_R=k_R*E,\ I_G=k_G*E,\ I_B=k_B*E \qquad \text{Eq. 2}$$

Eq. 2 is limited to when $I_R$, $I_G$, $I_B>2^b-1$ and $I_R$, $I_G$, $I_B=2b-1$.

In Eq. 2, $I_R$, $I_G$, and $I_B$ denote the intensities in R, G, and B channels, $k_R$, $k_G$, and $k_B$ denote a proportional factor, E denotes exposure, and b denotes the number of bits expressing the brightness intensity at a camera.

Since the characteristic curve enables to the processor to estimate the intensity of a pixel for various exposure levels although only one image is captured in a predetermined condition, it is not necessary to obtain a plurality of images with various exposures in order to obtain an optimal exposure setting.

Hereinafter, simulations performed for deducing the characteristic curve and confirming the reliability thereof will be described.

Characteristic Curve

A scene image has intensity values varying according to exposure levels. If the scene image pixel is divided to the same property of radiometry information, the pixel intensity increased or decreased at the same proportion as exposure.

Figure 5A:
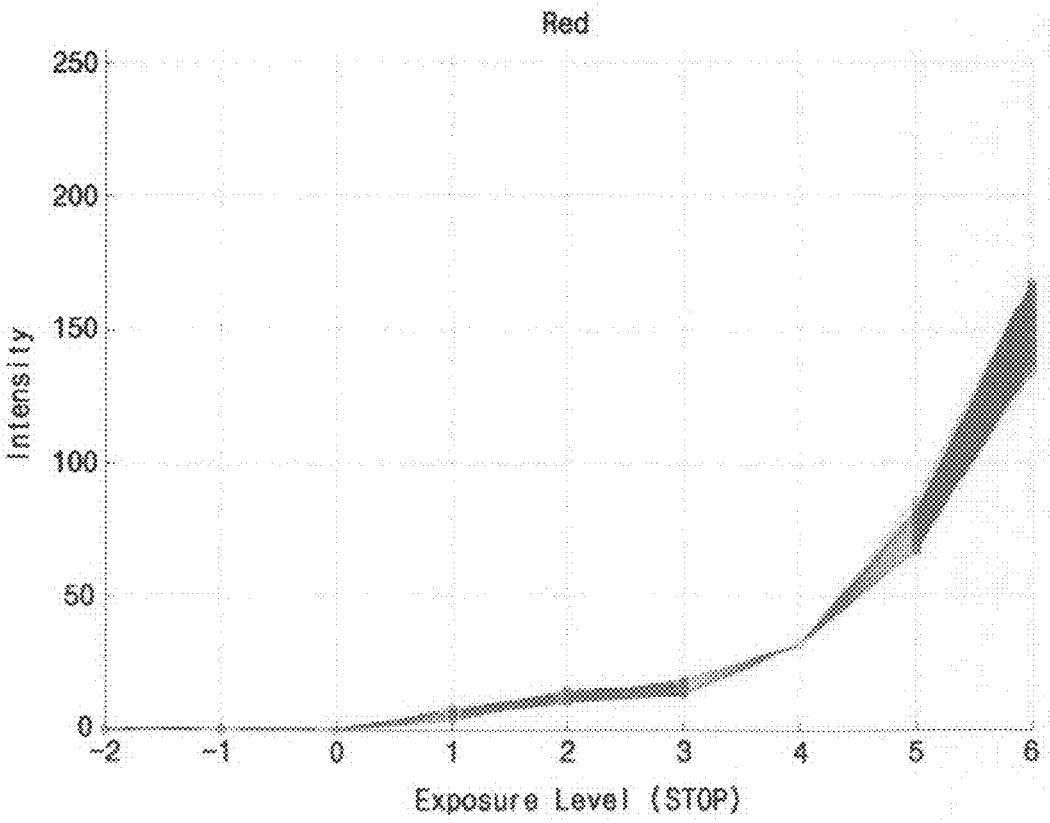
FIG. 5a PRIOR ART
FIGS. 5a to 5c are graphs showing characteristic curves in a red channel, a green channel, and a blue channel by measuring brightness variation of pixels according to changes of an exposure.
Figure 5B:
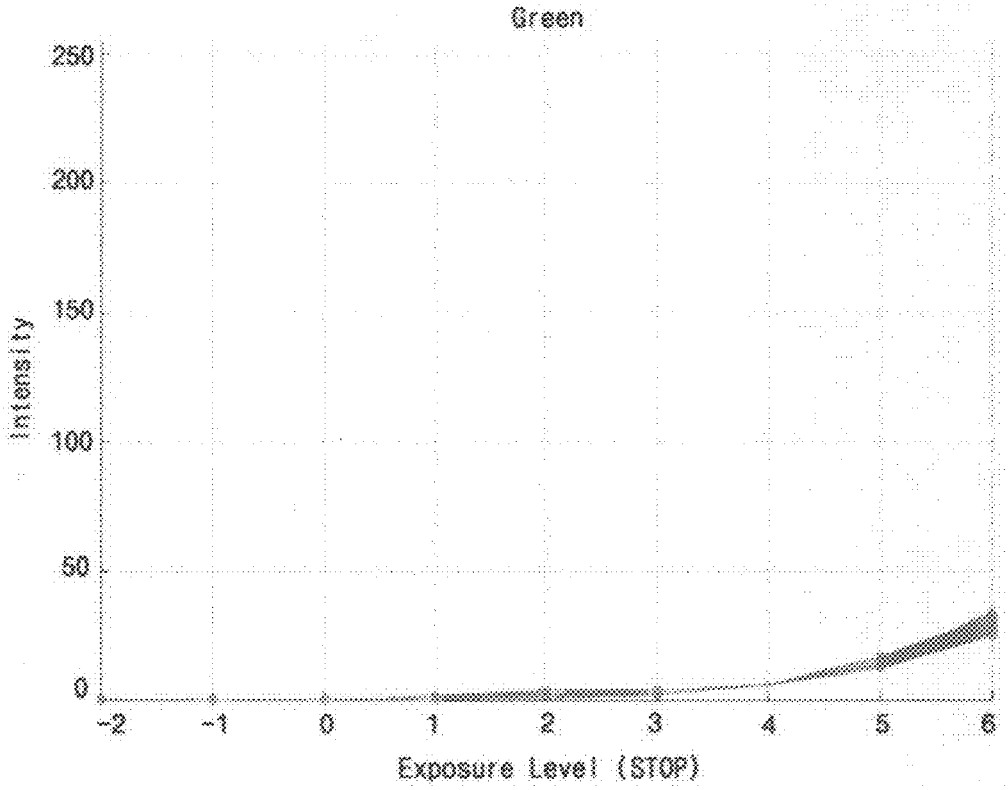
FIG. 5b PRIOR ART
Figure 5C:
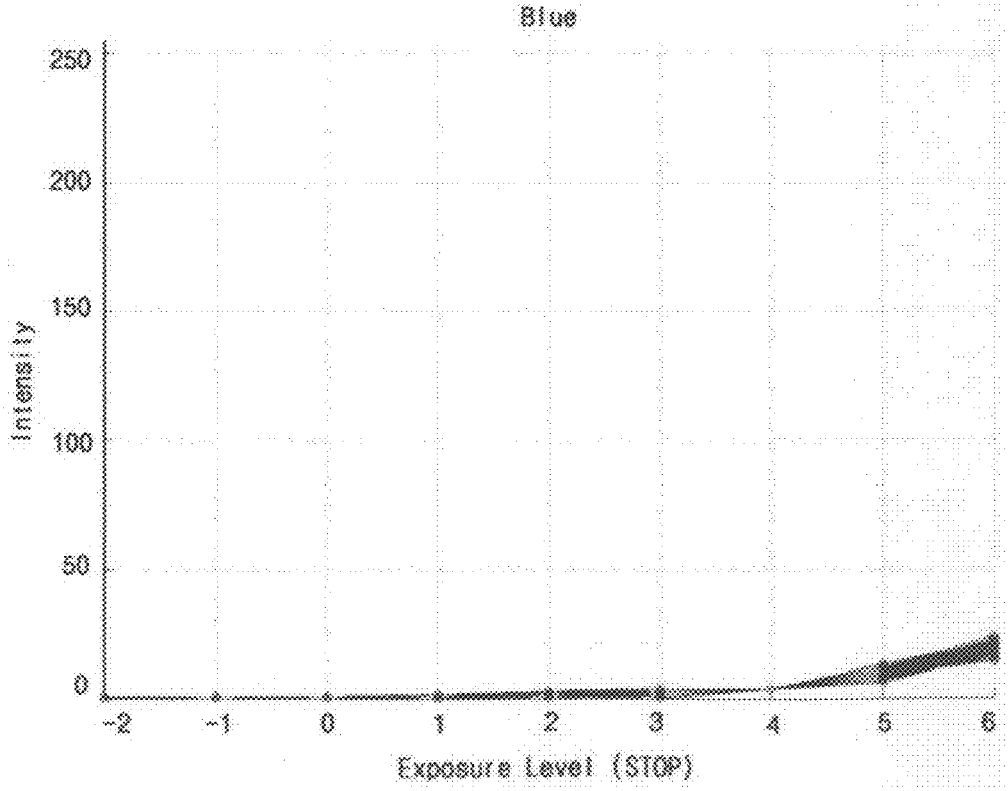
FIG. 5c PRIOR ART

FIGS. 5a to 5c are graphs showing simulation results of measuring intensity of a predetermined pixel according to various exposure levels that change under a fluorescent light. An object made of the same material was used to perform the present simulation in order to make an assumption of the same reflectivity. In the present simulation, color is divided into three channels Red, Green, and Blue because the brightness of a gray level can express a plurality of different colors for the same intensity in general. FIGS. 5a to 5c show intensity variation of R, G, and B channels according to exposure levels. As shown, generally, the intensities of R, G, and B channels were about converged although spread phenomenon was shown in pixel intensity of a predetermined exposure level due to the external light.

In FIGS. 5a and 5c, each step of exposure of a horizontal axis is expressed as an exposure level STOP. Since one STOP difference increases or decreases an amount of incoming light (exposure) two times, the characteristic curves of FIGS. 5a to 5c can be converted to simple linear curves of FIGS. 6a and 6c by changing exposure levels in terms of linear instead of logarithm. Therefore, the characteristic curve can be expressed as a curve or a straight line according to how each step of exposure is expressed, such as an exposure level STOP or an exposure (amount of incoming light). However, the present invention is not limited thereto because they can be easily converted by simple calculation. Thus, exposure level STOP and exposure can be selectively used as a term of denoting steps of exposure throughout the specification for convenience.

Figure 6A:
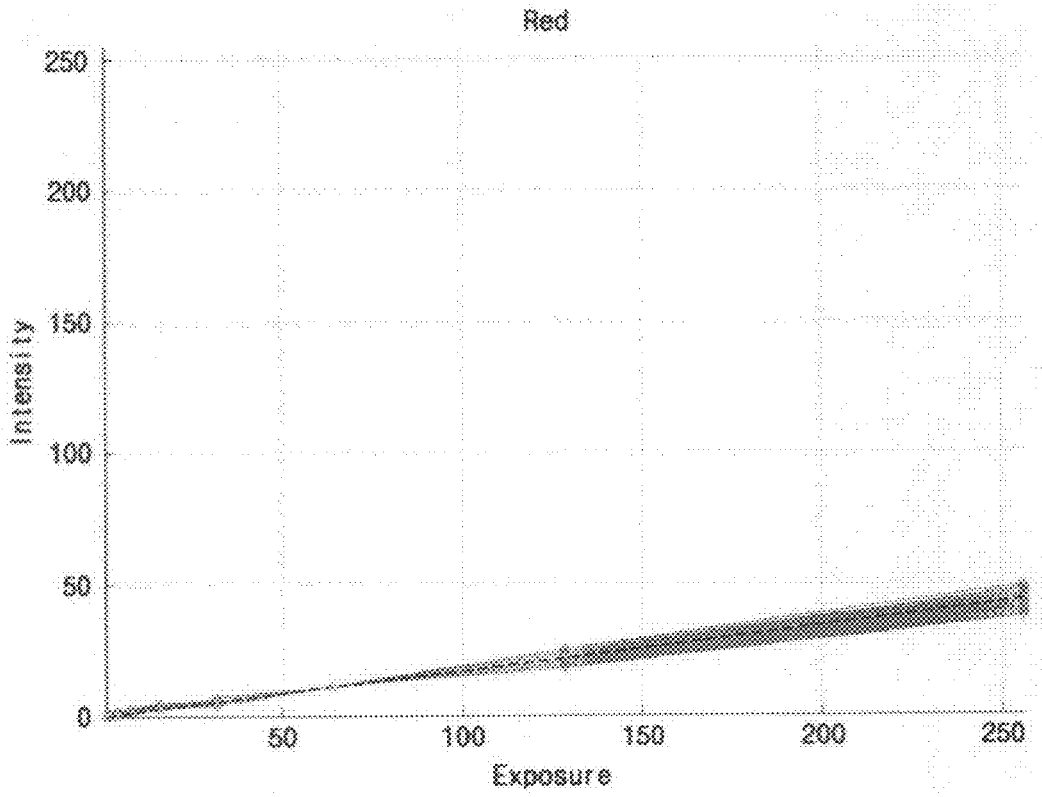
FIG. 6a PRIOR ART
FIGS. 6a to 6c are graphs generated by changing each step of exposure in the characteristic curves of FIGS. 5a to 5c in terms of linear instead of logarithm.
Figure 6B:
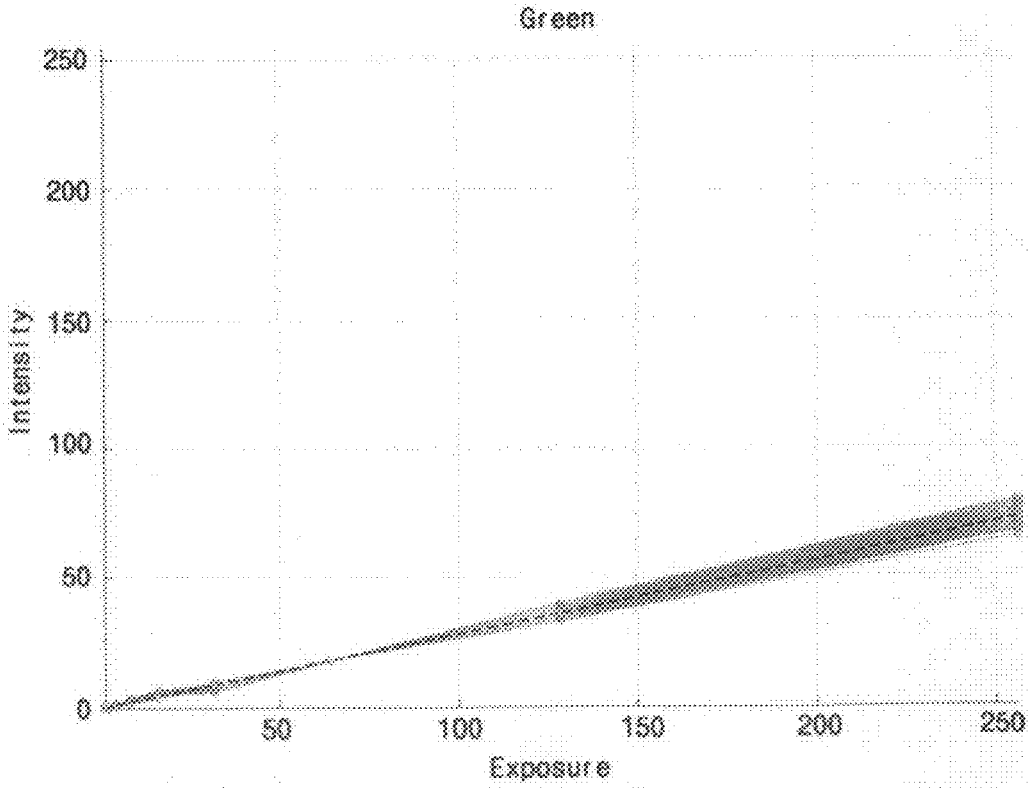
FIG. 6b PRIOR ART
Figure 6C:
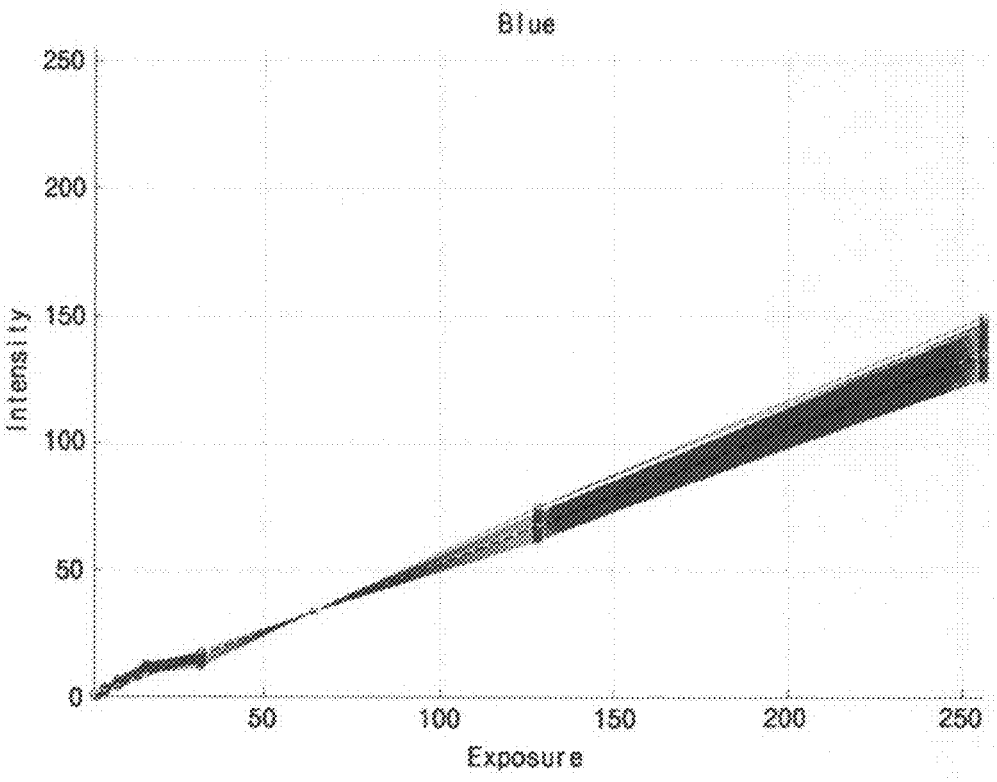
FIG. 6c PRIOR ART

Proportional factors $k_R$, $k_G$, and $k_B$ are calculated by selecting one image from a plurality of obtained images for measuring intensity of a pixel according to an exposure level in the simulation of FIGS. 5a and 5c and applying the measured intensities $I_R$, $I_G$, and $I_B$ for the same pixel and the applied exposure E to Eq. 2. Then, intensities $I_R$, $I_G$, and $I_B$ of a pixel are calculated by inputting various exposures to the variable E of Eq. 2 after inputting the calculated values instead of $k_R$, $k_G$, and $k_B$. Finally, a characteristic curve is created using the calculated data as a graph showing pixel intensities $I_R$, $I_G$, and $I_B$ according to exposure E variation. FIGS. 6a and 6c show the characteristic curve created based on the estimated values calculated based on Eq. 2 as thick dotted lines. As shown in FIGS. 6a and 6c, the estimated values are in the range of measured values, which are expressed as solid lines.

Therefore, the graphs clearly show that reliable estimation values of pixel intensity according to exposure variation can be obtained using only one image obtained from a predetermined exposure based on the method for generating the characteristic curve according to the present embodiment used in the simulations.

Figure 4:
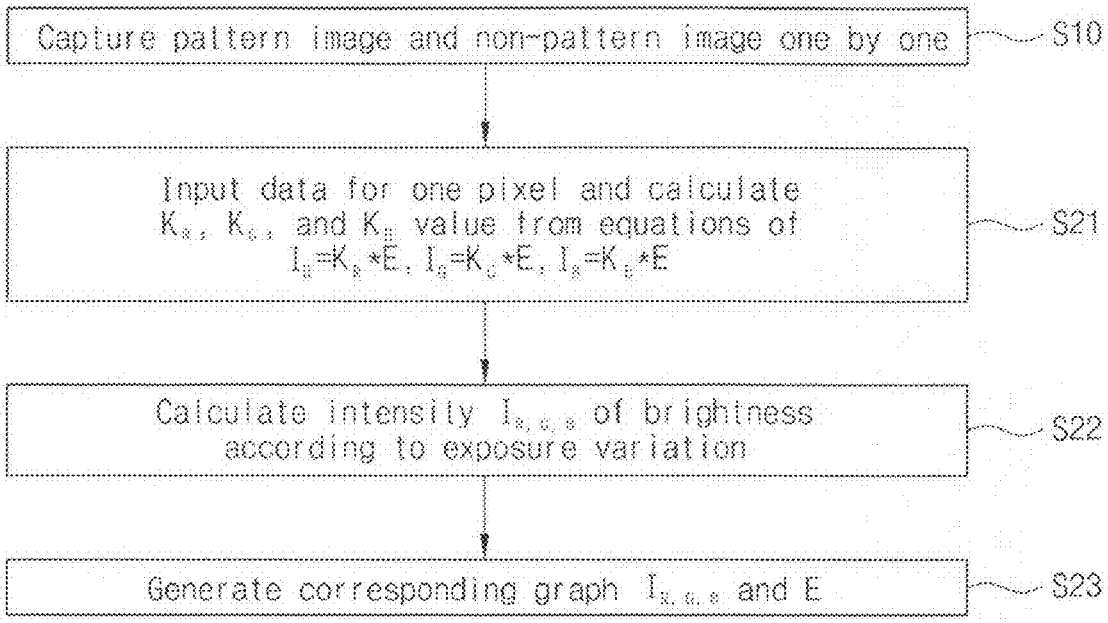
FIG. 4 is a flowchart illustrating a method for generating a characteristic curve for determining an optimal exposure in accordance with an embodiment.

Based on the above described simulation, a method for generating a characteristic curve according to an embodiment will be described. In the step S20 shown in FIG. 4, following operations are performed to generate the characteristics curve. At step S21, the exposure E used in the step S10 is obtained, and intensities $I_R$, $I_G$, and $I_B$ are calculated by dividing measured intensity of the same pixel in each obtained image into R, G, and B channels. Then, proportional factors $k_R$, $k_G$, and $k_B$ are calculated by inputting the obtained exposure E and the calculated $I_R$, $I_G$, and $I_B$ to Eq. 2. At step S22, intensities $I_R$, $I_G$, and $I_B$ of a corresponding pixel are calculated according to exposure variation by inputting various exposures E to Eq. 2. At step S23, a graph is created by corresponding calculated intensities with corresponding exposure using the calculated data. If characteristic curves are created for each of R, G, and B channels, three characteristic curves for each of a 0 state and a 1 state are generated.

At the step S30, the processor estimates an intensity of a corresponding pixel according to exposure level variation for the 0 state and the 1 state using the created characteristic curve and calculates the intensity difference ΔI or the brightness ratio SNR for a corresponding pixel at the 0 state and the 1 state using the estimated intensity. In the step S30, the characteristic curves of R, G, and B channels for the 0 state and the 1 state can be converted into a characteristic curve of a gray level for each state by adding them together. In this case, the estimated intensity of the pixel is expressed as a gray level.

At the step S40, the processor collects data of the intensity difference ΔI or the brightness ratio SNR in the 0 state and the 1 state according to the exposure level variation for all pixels by repeating the steps S20 and S30 for all pixels in each image.

At the step S50, the processor discriminates pixels having spread phenomenon (saturation) and non-pattern projected pixels from the image of the 1 state among the collected data at the step S40 and excludes the data of intensity difference ΔI or the brightness ratio SNR of the discriminated pixels from the collected data. Here, the processor may set an enable term as a factor for checking the collected data, check the enable term as Disable for a pixel in which spread phenomenon (saturation) occurs in 1 state and classify the intensity difference ΔI or the brightness ratio SNR thereof as unreliable data.

At the step S60, the processor calculates the number pixels having the intensity difference ΔI or the brightness ratio SNR exceeding an intensity difference threshold $\Delta I_{th}$ or a brightness ratio threshold $SNR_{th}$ using the data of the intensity difference ΔI or the brightness ratio SNR according to exposure level variation per each pixel, and decides an exposure level having the largest number of pixel exceeding the threshold values as an optimal exposure level. Here, it is preferable to use a minimum intensity difference ΔI and a minimum brightness ratio SNR that can discriminate a pattern projected area and a no pattern projected area from the obtained image as the intensity difference threshold $\Delta I_{th}$ or the brightness ratio threshold $SNR_{th}$. If the optimal exposure level is decided using a SNR value, a threshold $SNR_{th}$ may be about 0.1 to 0.2 when the SNR value is standardized to 256 gray levels.

Figure 7:
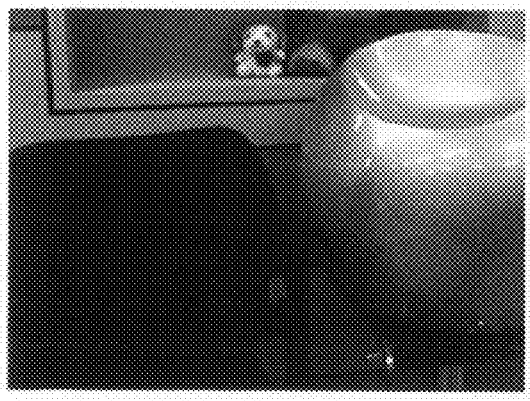
FIG. 7 shows images captured when a projecting means is turned on and off in accordance with an embodiment of the present invention.
Figure 7:
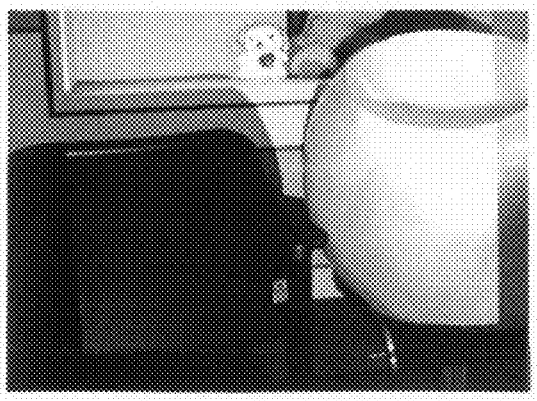

FIGS. 7 to 9 are diagrams illustrating major steps of a method for determining an optimal exposure in accordance with an embodiment.

Figure 8A:
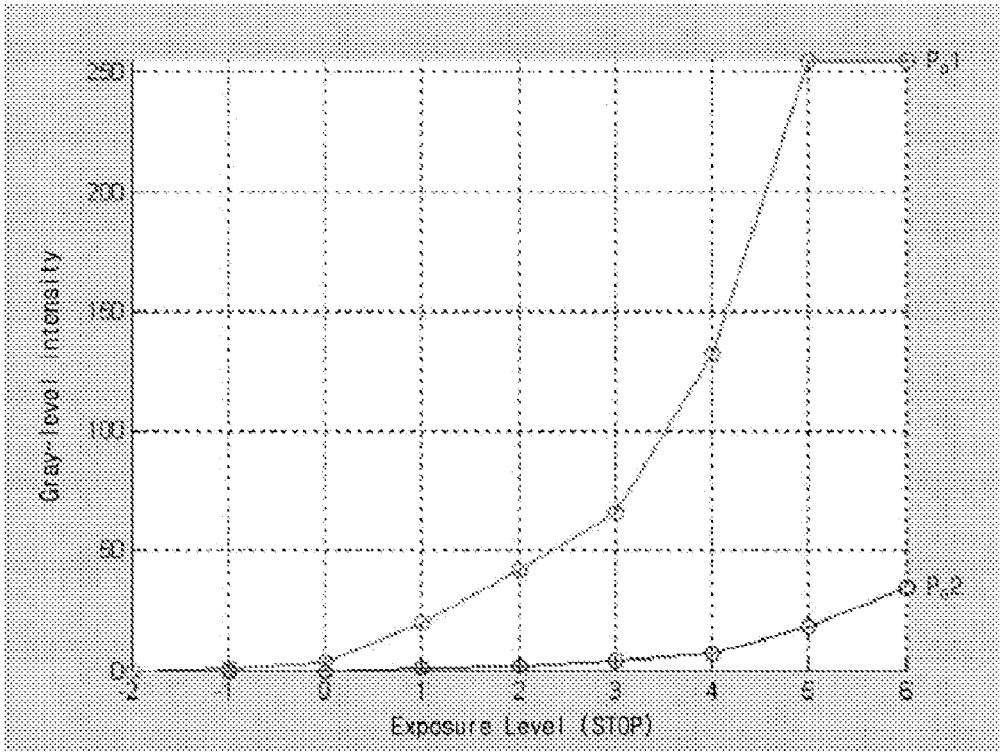
FIG. 8a is a graph illustrating a characteristic curve generated for two pixels in an image captured when a projecting means is turned off, which in FIG. 7.
Figure 8B:
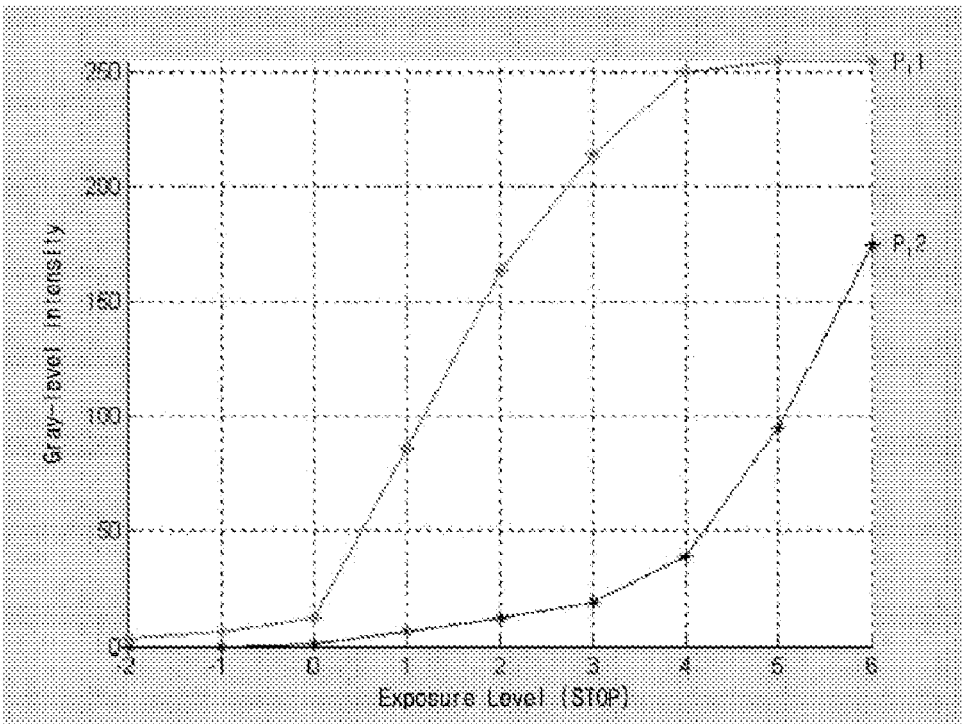
FIG. 8b is a graph illustrating a characteristic curve generated for the same two pixels in an image captured when a projecting means is turned on, which in FIG. 7.
Figure 8C:
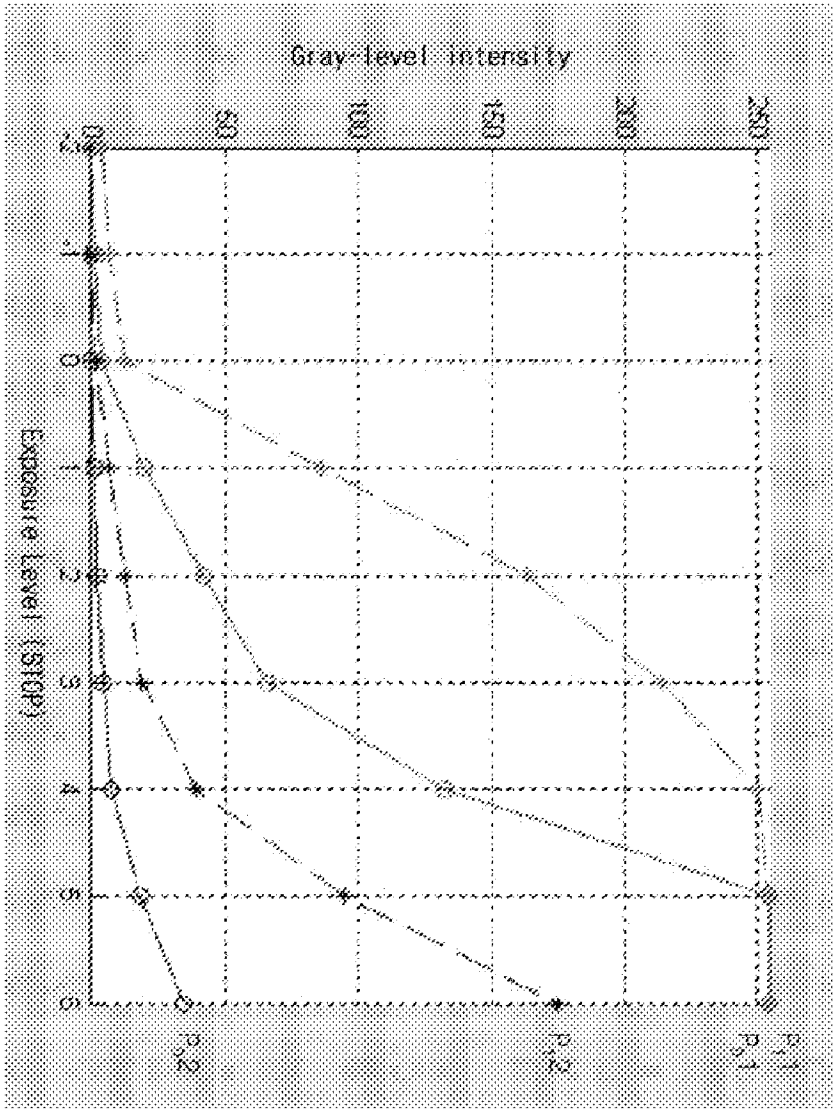
FIG. 8c is a graph showing the characteristic curves of FIGS. 8a and 8b at the same time.
Figure 9A:
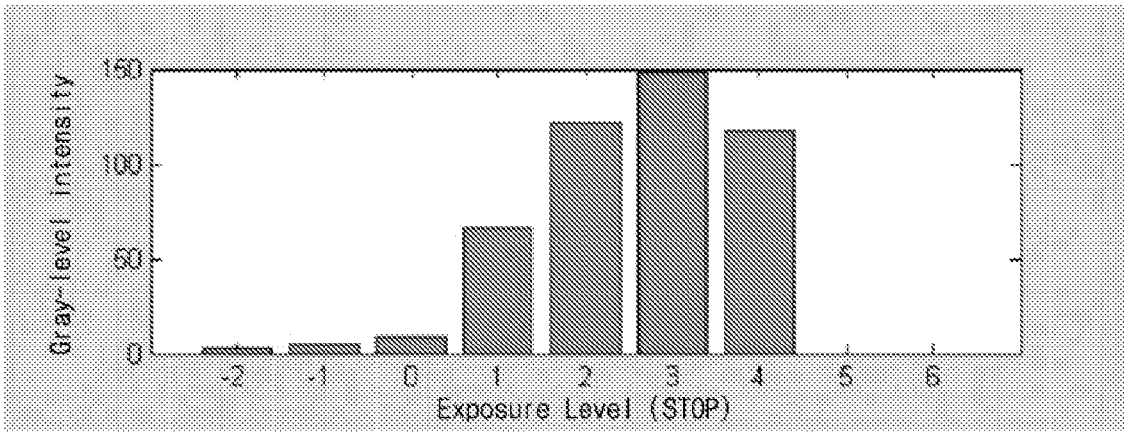
FIGS. 9a and 9b are graphs showing intensity difference values for two pixels using the characteristic curves of FIGS. 8a to 8c.
Figure 9B:
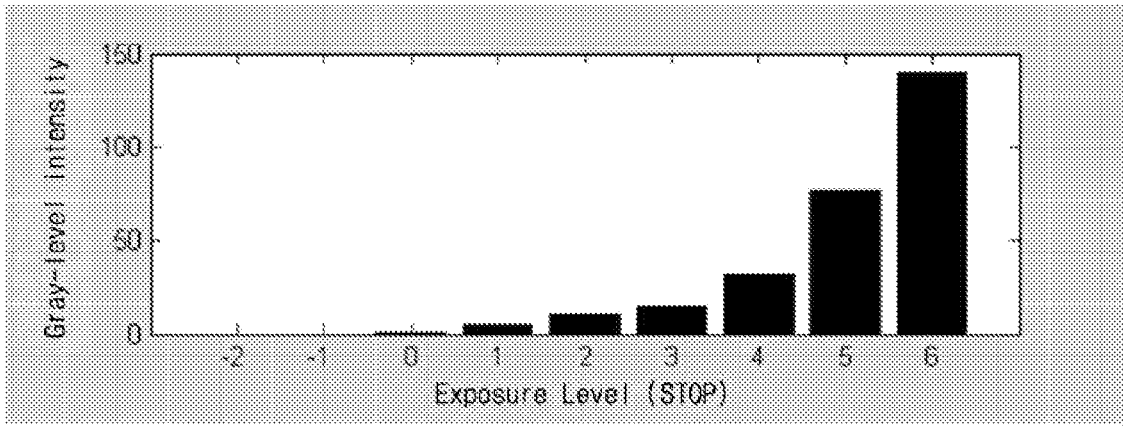

In FIG. 7, an image I shows an image obtained in a 0 state, and an image II shows an image obtained in 1 state. FIG. 8a shows characteristic curves $P_0$1 and $P_0$2 generated using an exposure level applied to obtain an image and a measured intensity after selecting two pixels P1 and P2 from the image I and measuring the intensities thereof. FIG. 8b shows characteristic curves $P_1$1, and $P_1$2 generated by selecting two same pixels P1 and P2 from the image II as the image I. FIG. 8c shows the characteristic curves of FIGS. 8a and 8b in one graph. Using the characteristic curves in FIGS. 8a to 8c, FIG. 9a shows an intensity difference value of one pixel P1 in the 0 state and the 1 state, and FIG. 9b shows an intensity difference value of the other pixel P2 in the 0 state and the 1 state.

Figure 10:
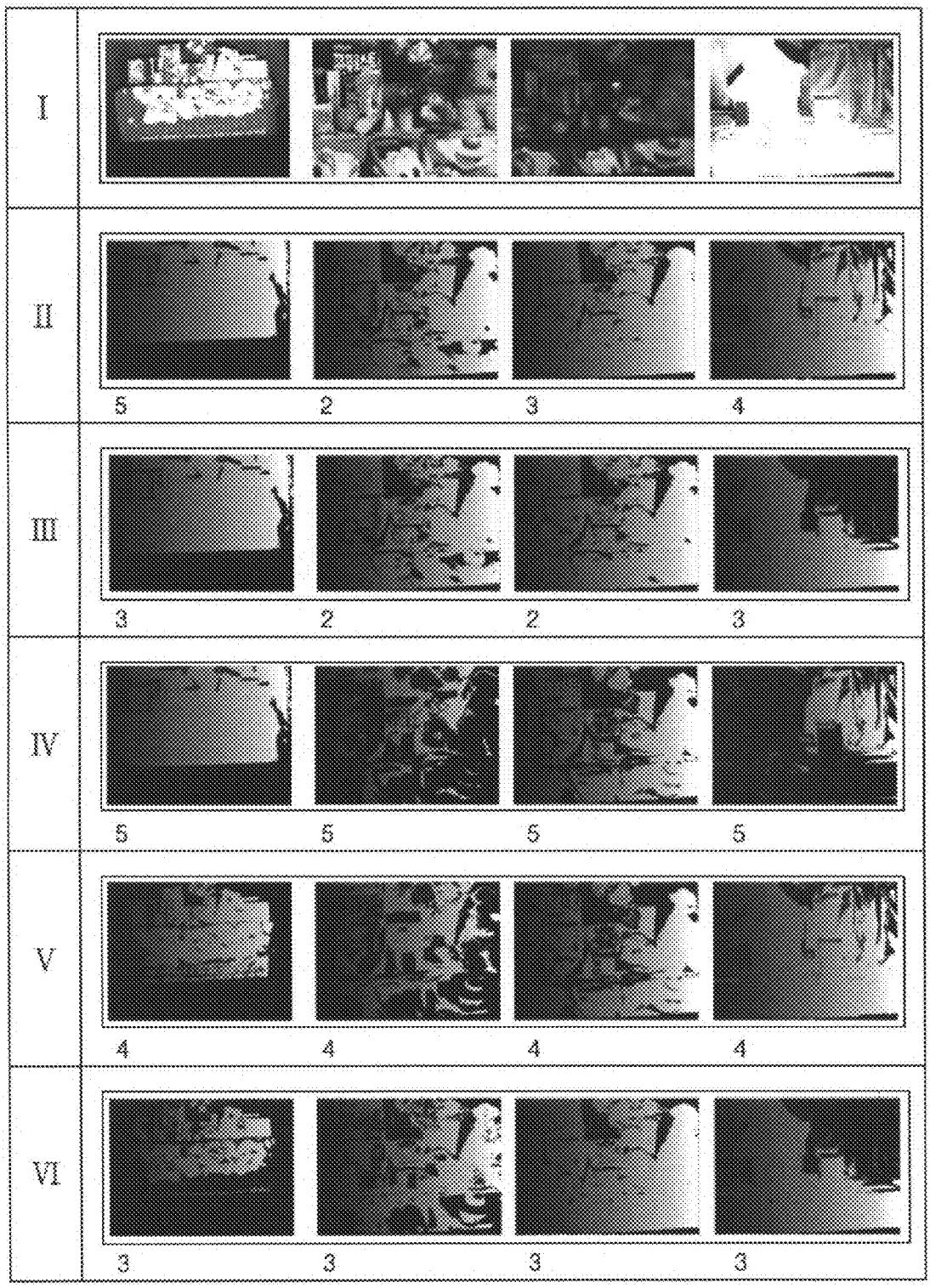
FIG. 10 is a diagram for comparing a 3D data reconstruction range obtained using a method for determining an optimal exposure according to the present invention with that obtained without using the same.

As described above, the intensity difference or the brightness ratio is calculated for all pixels in the images I and II, the number of pixels having the calculated intensity difference or the brightness ratio exceeding a predetermined threshold at every exposure levels using the data of the calculated intensity difference and brightness ratio, and an optimal exposure level is determined by selecting an exposure level having the largest number of pixels exceeding the threshold value, thereby increasing 3D data reconstruction range and improving the reliability thereof FIG. 10 is a diagram for comparing a reconstructable range of 3D data obtained using a method for determining an optimal exposure according to the present invention with that obtained without using the same.

Images in the first row I show images obtained by photographing target objects. The best exposure level is found by photographing the target objects with all of exposure levels. Images in the second row II are images obtained using the found best exposure level. The number of 3D data obtained in each best exposure level is set to 100% so that it can be used as reference for comparing the number of 3D data obtained at different exposure levels. As shown, the best exposure level is STOP 5-2-3-4. Images in the third row III are images obtained using the method for determining an optimal exposure according to an embodiment of the present invention. Images in the fourth row IV are images captured with a fixed STOP 5, and images in the fifth row V are images captured with a fixed STOP 4. Images in the sixth row VI are images captured with a fixed STOP 3.

As shown in FIG. 10, the images in the third row III show 91.75% of a data recover rate comparing to the images in the second row II by controlling the exposure level as STOP 5-2-2-3. Images in the fourth row IV to the sixth VI row show 62%, 75.7%, and 75% of data recover rates, which the method for determining an optimal exposure level is not applied. Therefore, FIG. 10 clearly shows that a reliable data recover rate can be achieved under various environmental conditions if the optimal exposure level determined according to the present embodiment is applied to recover 3D data.

As described above, the method and system for determining an optimal exposure level of a structured light based 3D camera according to an embodiment can improve a reconstructable range and reliability of 3D data in various applications which need to measure objects with different surface properties and different illumination conditions. Therefore, the method and system for determining an optimal exposure of a structured light based 3D camera according to an embodiment can be applied to various industrial fields such as inspection equipment using a 3D measuring method, 3D image modeling/recognition, and robot vision.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

The method and system for determining an optimal exposure of a structured light based 3D camera according to an embodiment can improve a reconstructable range and reliability of 3D data by determining an optimal exposure level that can optimally discriminate patterns according to environmental condition variation.

Also, it is not necessary to obtain a plurality of images for determining an optimal exposure for various environment factors by providing the method for creating a characteristic curve to estimate variation of pixel intensity according to an exposure level.

What is claimed is:

1. A method for determining an optimal exposure of a structured light based three dimensional (3D) camera system including a projecting means for illuminating a predetermined pattern on a target object, an image capturing means for capturing an image of the target object with the pattern projected *thereon*, and a processing means for reconstructing 3D data based on the captured image, wherein the method comprises the steps of:

obtaining an image of a target object with a predetermined pattern projected thereon, which is illuminated from a projecting means, and an image of the target object without a predetermined pattern projected thereon; [and]

determining automatically an optimal exposure level of the structured light based 3D camera system using [said two kinds of images,] *said image of the target object with the predetermined pattern projected thereon and said image of the target object without the predetermined pattern projected thereon; and*

*controlling an exposure level of the structured light based 3D camera system based on the determined optimal exposure level,*

*wherein the determining automatically the optimal exposure level of the structured light based 3D camera system using said image of the target object with the predetermined pattern projected thereon and said image of the target object without the predetermined pattern projected thereon includes processing data from at least one characteristic curve associated with the image of the target object with the predetermined pattern projected thereon and processing data from at least one characteristic curve associated with the image of the target object without the predetermined pattern projected thereon to determine the optimal exposure level.*

2. The method of claim 1, wherein the step of determining automatically an optimal exposure level comprises a) dividing an intensity of a corresponding pixel into red intensity, green intensity, and blue intensity of three channels (R, G, B) for one same pixel at each of the captured images, and generating a characteristic curve for each of the three channels for showing the intensity of a pixel for each channel according to variation of exposure levels;

b) estimating intensity I of the corresponding pixel according to variation of exposure levels using the generated characteristic curves, and calculating an intensity difference $\Delta I$ or a brightness ratio SNR between the image of the target object with the predetermined pattern projected and the image of the target object without the predetermined pattern for the corresponding pixel using the estimated intensity;

c) collecting brightness data about intensity differences $\Delta I$ or brightness ratios SNR according to variation of exposure levels for all pixels by repeating the steps a) and b) for all pixels of each image;

d) discriminating pixels with spread phenomenon (saturation) occurred or the pixels without the predetermined pattern projected when the projecting means projects the predetermined pattern from the collected brightness data and excluding the brightness data of the discriminated pixels; and e) calculating the number of pixels having an intensity difference ΔI and a brightness ratio SNR exceeding a predetermined threshold $\Delta I_{th}$ or $SNR_{th}$ at every exposure levels using the brightness data filtered at the step d) and deciding an exposure level having a largest calculated number of pixels as an optimal exposure level.

3. The method of claim 2, wherein the characteristic curves are created based on proportional relation between an intensity and an exposure, where the intensity denotes brightness of a pixel and the exposure is an amount of incoming light.

4. The method of claim 3, wherein in the step a), proportional factors $k_R$, $k_G$, and $k_B$ are calculated by applying an exposure applied for capturing the images in the image obtaining step and red intensity, green intensity, and blue intensity for one same pixel in each of the obtained images to an equation: $I_R=k_R*E$, $I_G=k_G*E$, $I_B=k_B*E$, intensities of a corresponding pixel are calculated for input exposures by inputting various exposures to the equation, and the characteristic curve is created by corresponding the calculated intensities of a corresponding pixel with the input exposures, where $I_R$, and $I_G$ and $I_B$ denote the intensities in R, G, and B channels, $k_R$, $k_G$, and $k_B$ denote a proportional factor, and E denotes an exposure in the equation.

5. The method of claim 4, wherein in the step b), intensity of a gray level of a corresponding pixel is estimated according to variation of exposure levels by transforming the created characteristic curves for red, green, and blue channels to a characteristic curve of a gray level.

6. The method of claim 5, wherein in the step d), an enable term is set as a factor for checking the collected brightness data, is checked as Disable for a pixel in which spread phenomenon (saturation) occurs when the projecting means illuminates the predetermined pattern and an intensity difference ΔI or a brightness ratio SNR of the pixel is classified as unreliable data.

7. The method of claim 6, wherein in the step e), the brightness threshold $\Delta I_{th}$ or $SNR_{th}$ for the intensity difference or the brightness ratio is set as minimum intensity difference or minimum brightness ratio for discriminating an area with the predetermined pattern illuminated from an area without the predetermined pattern illuminated.

*8. The method of claim 1, further comprising adjusting an exposure level of the image capturing means by adjusting at least one of an aperture of an iris and a shutter speed.*

*9. The method of claim 1, wherein the data from the at least one characteristic curve associated with the image of the target object with the predetermined pattern projected thereon and the data from the at least one characteristic curve associated with the image of the target object without the predetermined pattern projected thereon includes at least one of pixel intensity data and exposure level data.*

*10. The method of claim 1, wherein the processing data from the at least one characteristic curve associated with the image of the target object with the predetermined pattern projected thereon includes identifying pixels of the image having an intensity difference exceeding a threshold difference.*

*11. The method of claim 1, wherein the processing data from the at least one characteristic curve associated with the image of the target object without the predetermined pattern projected thereon includes identifying pixels of the image having an intensity difference exceeding a threshold difference.*

*12. The method of claim 1, wherein the processing data from the at least one characteristic curve associated with the image of the target object with the predetermined pattern projected thereon includes identifying pixels of the image having a signal to brightness ratio exceeding a threshold brightness ratio.*

*13. The method of claim 1, wherein the processing data from the at least one characteristic curve associated with the image of the target object without the predetermined pattern projected thereon includes identifying pixels of the image having a brightness ratio exceeding a threshold brightness ratio.*

*14. The method of claim 1, wherein the projecting means comprises a beam projector.*

*15. The method of claim 1, wherein the image capturing means comprises a camera.*

*16. The method of claim 1, wherein the processing means comprises a computer.*

*17. A method comprising:*

*projecting, via a projecting means of a structured light based 3D camera system, a predetermined pattern on a target object;*

*obtaining, via an image capturing means of the structured light based three dimensional (3D) camera system, a first image of the target object without the predetermined pattern projected thereon, the first image including a first pixel and a second pixel;*

*obtaining, via the image capturing means, a second image of the target object with the predetermined pattern projected thereon, the second image including a third pixel corresponding to the first pixel of the first image and a fourth pixel corresponding to the second pixel of the first image, the structured light based 3D camera system including a processing means for reconstructing 3D data based on the first and second images;*

*determining automatically an optimal exposure level of the structured light based 3D camera system using the first image and the second image; and*

*controlling an exposure level of the structured light based 3D camera system based on the determined optimal exposure level,*

*wherein the determining automatically the optimal exposure level of the structured light based 3D camera system using the first image and the second image includes*

*determining, for each of a plurality of exposure levels, a difference between an intensity of the first pixel and an intensity of the second pixel,*

*determining, for each of the plurality of exposure levels, a difference between an intensity of the third pixel and an intensity of the fourth pixel, and*

*determining one of the plurality of exposure levels as the optimal exposure level based on the determined differences.*

*18. The method of claim 17, wherein the processing means comprises a computer.*

*19. The method of claim 17, further comprising adjusting an exposure level of the image capturing means by adjusting at least one of an aperture of an iris and a shutter speed.*

*20. The method of claim 17, wherein the projecting means comprises a beam projector.*

*21. The method of claim 17, wherein the image capturing means comprises a camera.*

*22. A method comprising:*

*projecting, via a projecting means of a structured light based 3D camera system, a predetermined pattern on a target object;*

*obtaining, via an image capturing means of the structured light based three dimensional (3D) camera system, a first image of the target object without the predetermined pattern projected thereon, the first image including a first pixel and a second pixel;*

*obtaining, via the image capturing means, a second image of the target object with the predetermined pattern projected thereon, the second image including a third pixel corresponding to the first pixel of the first image and a fourth pixel corresponding to the second pixel of the first image, the structured light based 3D camera system including a processing means for reconstructing 3D data based on the first and second images;*

*determining automatically an optimal exposure level of the structured light based 3D camera system using the first image and the second image; and*

*controlling an exposure level of the structured light based 3D camera system based on the determined optimal exposure level,*

*wherein the determining automatically the optimal exposure level of the structured light base 3D camera system using the first image and the second image includes*

*determining, from the first image and the second image, estimated values of pixel intensities for a plurality of exposure levels, and*

*determining one of the plurality of exposure levels as the optimal exposure level based on the estimated values of pixel intensities.*

*23. The method of claim 22, wherein the image capturing means comprises a camera.*

*24. The method of claim 22, wherein the processing means comprises a computer.*

*25. The method of claim 22, further comprising adjusting an exposure level of the image capturing means by adjusting at least one of an aperture of an iris and a shutter speed.*

*26. The method of claim 22, wherein the projecting means comprises a beam projector.*

* * * * *